United States Patent
Park et al.

(10) Patent No.: US 6,928,293 B2
(45) Date of Patent: Aug. 9, 2005

(54) APPARATUS AND METHOD FOR RECEIVING QUICK PAGING MESSAGE IN MOBILE STATION

(75) Inventors: Hyung-Weon Park, Seoul (KR); Sang-Kyun Park, Shihung-shi (KR)

(73) Assignee: Samsung Electronics Co., Ltd. (KR)

( * ) Notice: Subject to any disclaimer, the term of this patent is extended or adjusted under 35 U.S.C. 154(b) by 444 days.

(21) Appl. No.: 10/109,257

(22) Filed: Mar. 27, 2002

(65) Prior Publication Data

US 2002/0142785 A1 Oct. 3, 2002

(30) Foreign Application Priority Data

Mar. 27, 2001 (KR) ........................................ 2001-16000

(51) Int. Cl.[7] .............................. H04B 1/38; H04B 1/69; H04M 1/00; H04Q 7/00
(52) U.S. Cl. .................... 455/458; 455/574; 455/426.1; 375/133; 375/147; 340/7.43
(58) Field of Search ............................ 455/574, 426.1, 455/458, 515, 502, 466, 412, 85, 86, 141, 196.1, 208, 265, 204, 255, 259; 375/133, 147; 340/7.43

(56) References Cited

U.S. PATENT DOCUMENTS

| | | | | |
|---|---|---|---|---|
| 4,091,410 A | * | 5/1978 | Citta | 348/726 |
| 4,618,996 A | * | 10/1986 | Rafal et al. | 455/46 |
| 5,594,776 A | * | 1/1997 | Dent | 455/458 |
| 5,638,054 A | * | 6/1997 | Davis et al. | 340/7.39 |
| 5,717,319 A | * | 2/1998 | Jokinen | 323/280 |
| 5,987,339 A | * | 11/1999 | Asano | 455/574 |
| 6,111,865 A | * | 8/2000 | Butler et al. | 370/335 |
| 6,300,864 B1 | * | 10/2001 | Willey | 340/7.43 |
| 6,421,540 B1 | * | 7/2002 | Gilhousen et al. | 455/458 |
| 6,456,841 B1 | * | 9/2002 | Tomimori | 455/412.2 |
| 6,526,295 B1 | * | 2/2003 | Shull | 455/574 |
| 6,542,727 B1 | * | 4/2003 | Kikuchi | 340/7.33 |
| 6,680,920 B1 | * | 1/2004 | Wan | 370/311 |
| 6,687,285 B1 | * | 2/2004 | Jou | 375/133 |
| 6,728,300 B1 | * | 4/2004 | Sarkar et al. | 375/147 |

* cited by examiner

*Primary Examiner*—William Trost
*Assistant Examiner*—Kiet Doan
(74) *Attorney, Agent, or Firm*—Dilworth & Barrese LLP

(57) ABSTRACT

An apparatus and method for receiving a quick paging message in a mobile station wherein a controller for synchronizing with a second clock in a predetermined time slot and transmitting a command for obtaining a synchronization at a frequency of receiving the quick paging message where the MS selects a clock having a first period as an operation clock under the second mode and under the first mode, selects a clock having a second period earlier than the first period; a dual phase-locked loop operating in response to the clock selected by the controller, for synchronizing with frequency in response to the command from the controller; a oscillator for oscillating at the synchronized frequency with the dual phase-locked loop; and a radio frequency part for receiving the quick paging message over a forward quick paging channel synchronously with the oscillating frequencies.

4 Claims, 7 Drawing Sheets

APPARATUS AND METHOD FOR RECEIVING QUICK PAGING MESSAGE IN MOBILE STATION

PRIORITY

This application claims priority to an application entitled "Apparatus and Method for Receiving Quick Paging Message in Mobile Station", filed in the Korean Industrial Property Office on Mar. 27, 2001 and assigned Serial No. 2001-16000, the contents of which are hereby incorporated by reference.

BACKGROUND OF THE INVENTION

1. Field of the Invention

The present invention relates to a mobile telecommunications system, and more particularly to an apparatus and method for receiving a quick paging message in a mobile station, which can minimize power consumption of the mobile station.

2. Description of the Related Art

Generally, in a code division multiple access (CDMA) mobile telecommunications system, such as an IS-95A mobile telecommunications system, a mobile station (MS) makes a transition from an idle sleep mode to a slotted mode for the monitoring of a paging channel only when there is a paging message directed to the MS from a base station (BS). In the slotted mode, the MS receives the paging message transmitted by the BS over the paging channel and then performs its operation based on the received paging message.

However, such a conventional method for receiving the paging message in the slotted mode has a disadvantage in that a sufficiently lengthy standby time, which is an essential requirement of the MS, can hardly be guaranteed because a large amount of power is consumed in performing a paging message re-acquisition operation and paging message reception operation. An IMT-2000 system, which is a 3rd generation mobile telecommunications system, employs a quick paging technique to decrease the MS power consumption such that the standby time is extended compared to that of an MS employing the conventional paging message reception method.

In the quick paging technique, a BS assigns a new forward quick paging channel (FQPCH) beside the paging channel to notify an MS of information about the presence or not of a paging message (i.e., paging/control message) transmitted over the forward quick paging channel on a slot basis. The BS transmits the information to the MS in a 1-bit message format without interleaving/encoding the information while the MS monitors the quick paging channel at an assigned location. The MS receives the 1-bit message at an assigned time without deinterleaving/decoding it. The MS then determines, based on the received 1-bit message, whether to monitor the paging channel. The quick paging message is repeatedly transmitted, for example, twice at every slot of 80 ms, that is, at intervals of 40 ms, typically at 9600 or 4800 bits per second (bps).

The 1-bit message is modulated by way of on-off keying (OOK) modulation, rather than binary-phase shift keying (BPSK) modulation. The reason for using the OOK modulation to modulate the 1-bit message is that if the BPSK is used to modulate the 1-bit message, the probability that data '1' will be generated is small and, therefore, a signal transmission for transmitting data '0' results in reduction in energy of different channels, thereby lowering the entire system performance. Therefore, the capability of the MS to receive the quick paging message is determined according to how accurately the OOK-modulated signal from the BS is demodulated. Referring to FIG. 1, a description will be given of an algorithm utilized for deciding two 1-bit messages in a demodulation process.

FIG. 1 is a view illustrating a general quick paging channel decision algorithm.

First, the MS demodulates a first bit ("Bit 1") to detect whether it is '0' (step 111). If the first bit is detected to be '0' at step 111, then the MS is changed from a current state to an idle sleep state directly without demodulating a second bit (step 113). Alternatively, if the first bit is detected to be '1' or 'Erasure' at the above step 111, then the MS demodulates the second bit to determine whether to make a transition to the idle sleep mode or to decode a paging channel (step 115) after transition to a slotted mode. The 'Erasure' is a bit, which is generated when a channel, or forward quick paging channel, is estimated to have a non-tolerable distortion, which 'Erasure' is determined to be '1' regardless of the result of demodulation of a quick paging symbol. If the second bit is also detected to be '1' or 'Erasure' at the above step 115, then the MS monitors the subsequent paging channel (step 117).

The above mentioned paging channel reception algorithm, which includes the idle sleep state transition, quick paging message reception and paging channel monitoring, is closely connected with MS power consumption for determining standby time of MS. The entire power consumption of the MS includes power consumption resulting from sleep current flowing in the idle sleep state, digital part power consumption, radio frequency (RF) part power consumption and so forth. In this regard, in order to extend the standby time of the MS, it is required to minimize the power consumption of each of the MS power components.

In particular, the sleep current can greatly affect MS power consumption negatively. The sleep current flows in the MS during reception of no message, resulting in MS power consumption. This sleep current is applied to an oscillator, liquid crystal display (LCD) unit, microprocessor, power supply, etc. of the MS. Especially, the use of a high frequency oscillator as a sleep counter, results in increase of the sleep current and a large amount of power being consumed. Consequently, there is a problem in that the standby time of the MS is reduced due to such sleep current.

In addition, upon reception of the quick paging message, if the MS having a single oscillator provides an identical clock speed of the oscillator as a reference clock, i.e., an operating clock regardless of a current mode, the elapsed time in receiving the quick paging message becomes longer because of the use of the identical clock speed of the oscillator, despite the MS rapidly receiving the quick paging message under the slotted mode.

SUMMARY OF THE INVENTION

Therefore, the present invention has been made in view of the above problems, and it is an object of the present invention to provide a paging message reception apparatus and method, which can minimize power consumption of a mobile station.

It is another object of the present invention to provide a paging message reception apparatus and method in which only a low frequency oscillator operates with the mobile station in an idle sleep state, thereby minimizing the amount of sleep current.

It is yet another object of the present invention to provide a paging message reception apparatus and method, which can minimize a paging message loss under the condition of a poor channel state.

It is still yet another object of the present invention to provide a paging message reception apparatus and method, which provide a separate clock speed for receiving a quick paging message.

In accordance with one aspect of the present invention, the above and other objects can be accomplished by the provision of an apparatus for receiving a quick paging message in a mobile station operated with first and second modes where the first mode is to receive a quick paging message in a predetermined time slot, comprising a controller for synchronizing with a second clock in a predetermined time slot and transmitting a command for obtaining a synchronization at a frequency of receiving the quick paging message where the MS selects a clock having a first period as an operation clock under the second mode and under the first mode, selects a clock having a second period earlier than the first period; a dual phase-locked loop operated in response to the clock selected by the controller, for synchronizing with frequency in response to the command from the controller, a oscillator for oscillating at the synchronized frequency with the dual phase-locked loop and a radio frequency part for receiving the quick paging message over a forward quick paging channel synchronously with the oscillating frequencies.

In accordance with another aspect of the present invention, there is provided a method for receiving a quick paging message in a mobile station operated with first and second modes where the first mode is to receive a quick paging message in a predetermined time slot, comprising the steps of selecting a clock having a second period earlier than a first period as an operating clock under the first mode of MS; and synchronizing with a clock having the selected second period and transmitting a command for receiving the quick paging message to a dual phase-locked loop at a predetermined time slot to be thereby locked in a frequency capable of receiving the quick paging message in response to the command.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the accompanying drawings. In the following description explanation of related functions or configurations which are known in the art are omitted for the sake of clearness in understanding the concept of the invention, as such would obscure the invention with unnecessary detail.

Figure 1:
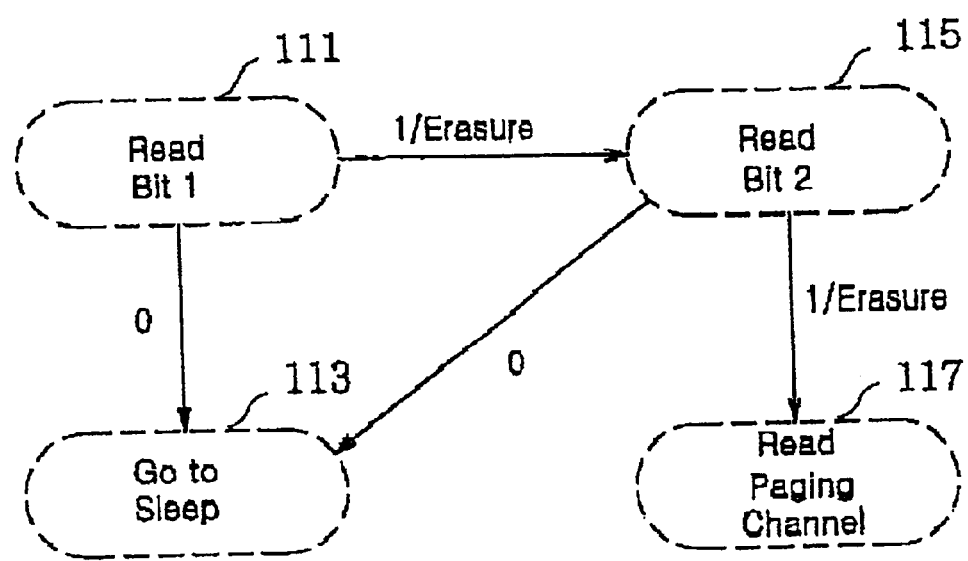
FIG. 1 is a view illustrating a general quick paging channel decision algorithm.
Figure 2:
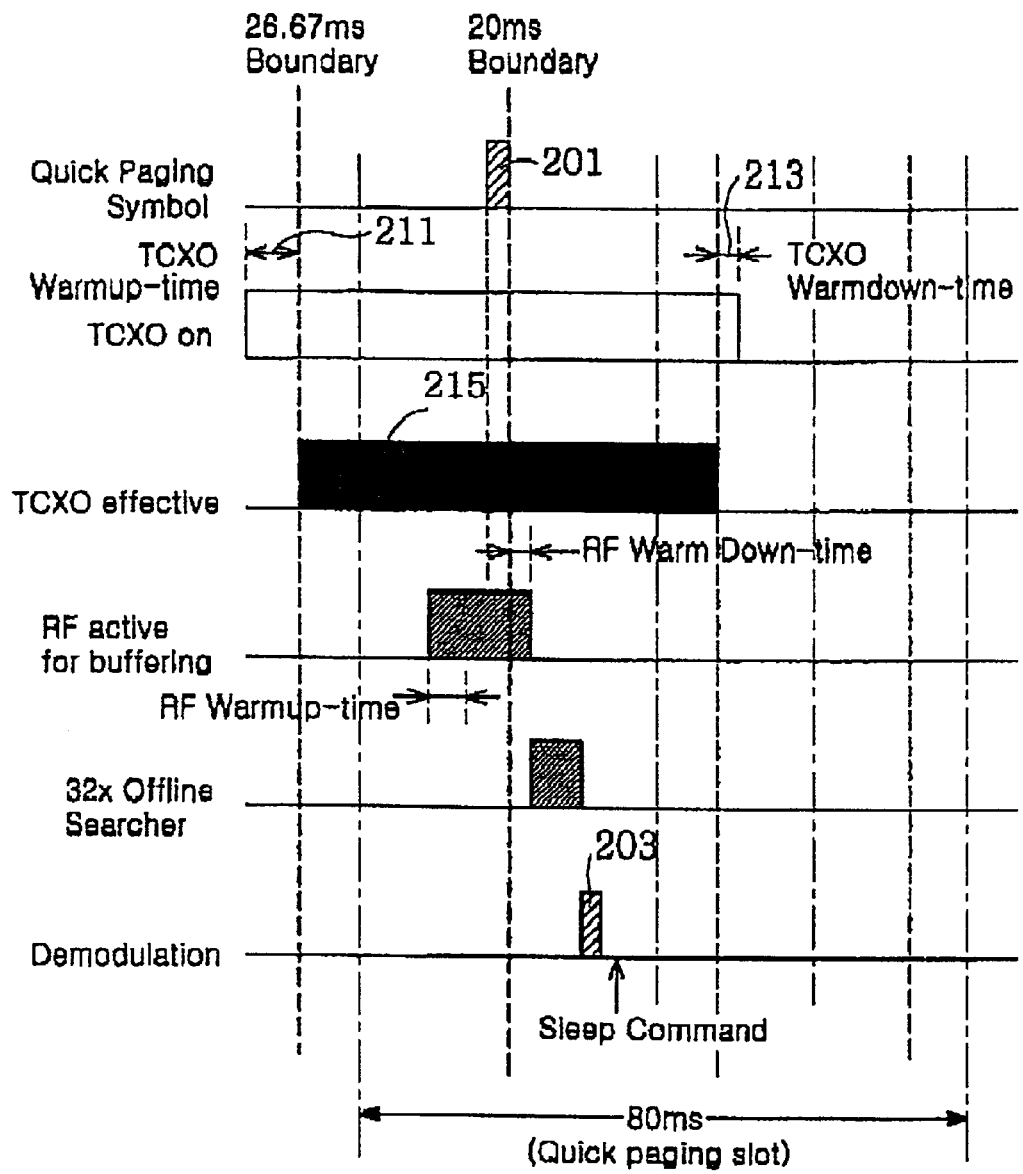
FIG. 2 is a timing diagram illustrating offline demodulation of a quick paging message in accordance with the present invention.

FIG. 2 is a timing diagram illustrating offline demodulation of a quick paging message in accordance with the present invention.

As shown in this drawing, a temperature compensation crystal oscillator (TCXO) is turned on/off with timing based on a boundary of 26.67 ms to equalize pseudo random noise (PN) states when the TCXO enters an idle sleep state and when the TCXO comes out of the idle sleep state. Each slot of the quick paging message described here has a length of 80 ms. The TCXO comes out of the idle sleep state and performs its operation only when a transmitted symbol 201 of the quick paging message is '1'. A period of time 211 is a warmup time for which the TCXO makes itself ready to operate, and a period of time 213 is a warmdown time for which the TCXO returns to the idle sleep state after completing its operation. Therefore, the TCXO substantially performs an effective operation only for a period of time 215. As shown in FIG. 2, since only one of two bit messages inputted within one slot of the quick paging message is '1', the TCXO returns to the idle sleep state. Namely, as a result of the quick paging message detection, there is no need to decode a paging channel and, therefore, a sleep command 203 is generated. A re-acquisition operation is performed offline after a received quick paging message is stored in a buffer of a Radio Frequency (RF) part.

Hereinafter, a description will be given of an offline quick paging message reception operation of the RF part with reference to FIG. 3.

Figure 3:
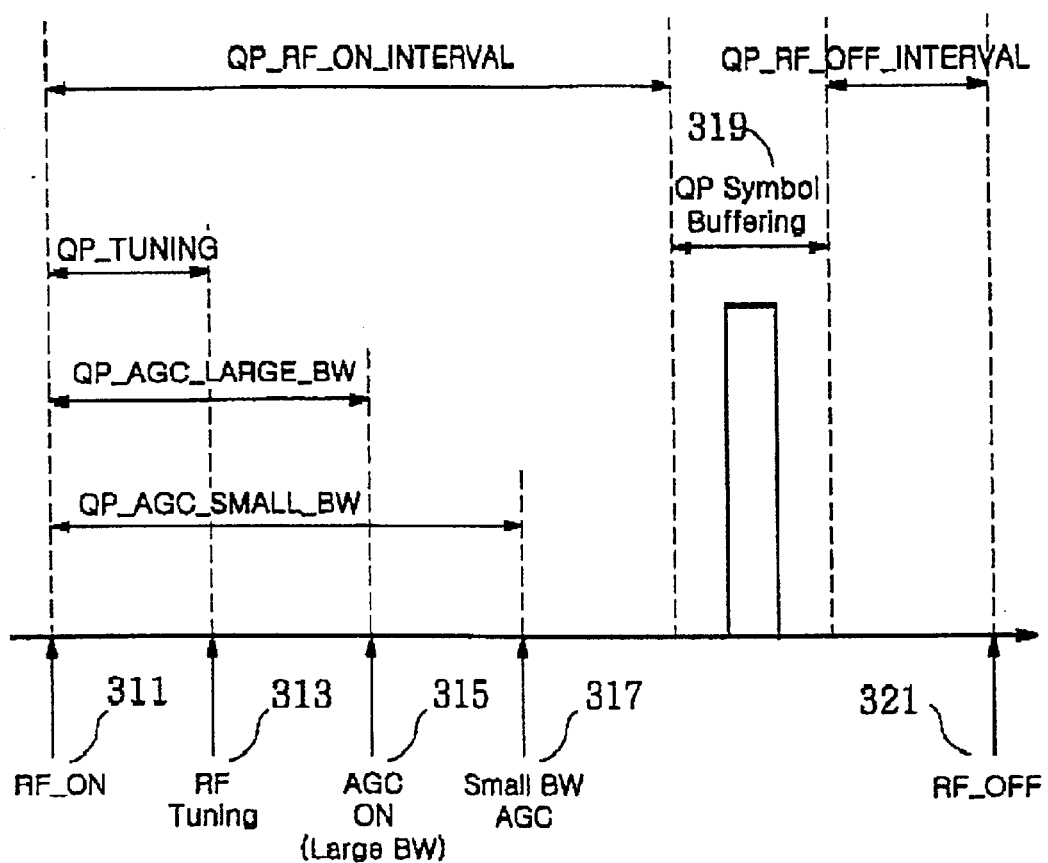
FIG. 3 is a timing diagram illustrating an offline quick paging message reception operation of a Radio Frequency (RF) part in FIG. 2.

FIG. 3 is a timing diagram illustrating the offline quick paging message reception operation of the RF part. This drawing expresses the quick paging message reception operation in a timing diagram from a point of time when the RF part is turned on to receive a symbol of the quick paging message to a point of time when the RF part is turned off. First, as shown in FIG. 2, the TCXO is turned on and then warms up, typically for a period of 2 ms. This is reported to a controller, which then generates CHIP×8 signals. The RF part, or more specifically in this operation, the RF receiver, which was in the idle sleep state, is turned on (311) and then changed from the idle sleep state to a standby state after the lapse on the order of 2 ms during which it warms up to operate normally. Then, by performing an RF tuning operation (313) after time interval QP_TUNING (Quick Paging Tuning), the controller provides data for a phase-locked loop (PLL) such that the PLL makes a transition to a locked state. An auto gain controller (AGC) controls the gain of the PLL to stabilize the PLL with a wide bandwidth (315). In this case, 73 μsec is taken as a loop gain constant. On the other hand, if the PLL is stabilized with a narrow bandwidth, the AGC uses a greater loop gain constant, preferably 392 μs, than that used to stabilize the PLL with the wide bandwidth (317). Once the RF part is ready to receive a quick paging message in the above manner, then it buffers the quick paging symbol of the quick paging message (319). Namely, the RF part buffers the quick paging message for time periods before and after a period of time in which the quick paging symbol is inserted. For example, if the quick paging message is transmitted at 4800 bps, 672 chips in a period of 546 μs are stored and if it is transmitted at 2400 kbps, 800 chips in a period of 650 μs are stored. If the quick paging symbol buffering operation is completed, then the controller (100) turns off the RF part over time interval QP_RF_

OFF_INTERVAL to return it to the idle sleep state at time RF_OFF (321). A period of 4 msec is typically required for the controller to completely change the RF part to the idle sleep state.

Figure 4:
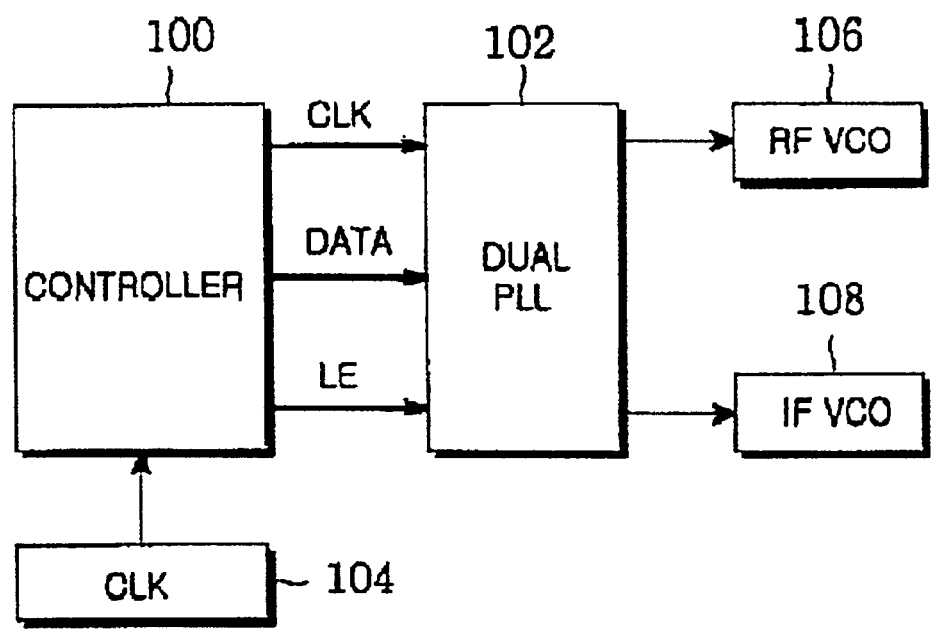
FIG. 4 is a block diagram showing the construction of a tuning block of the RF part.

Referring to FIG. 4, a description will be given of the RF part tuning operation below.

FIG. 4 is a block diagram showing the construction of a tuning block of the RF part.

Figure 5:
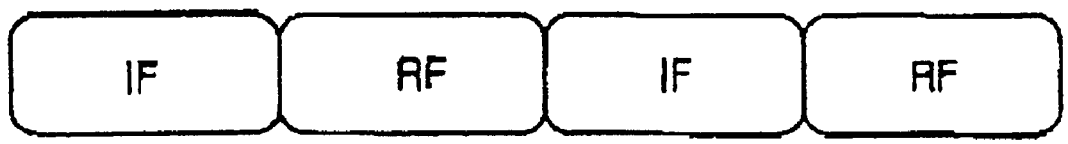
FIG. 5 is a view showing a data structure of a phase-locked loop in FIG. 4.

The tuning operation of the RF part is performed through a dual PLL 102. Namely, the current frequency of the input signal must be synchronized with either a radio frequency (RF) or an intermediate frequency (IF) of the RF part through the dual PLL 102. For this, the controller 100 transfers a command to the dual PLL 102 to instruct it to make transitions to synchronize the RF and IF. The command is composed of a clock signal CLK, a data signal DATA and a signal LE (Latch Enable). The controller 100 repeatedly transfers the RF and IF state transition commands to the dual PLL 102 a predetermined number of times, preferably 4 times, as an example like FIG. 5.

When the dual PLL 102 performs a lock operation to make transitions to the RF and IF in response to the command from the controller 100, as stated above, then an RF voltage controlled oscillator (RF VCO) 106 and an Intermediate Frequency Voltage Controlled Oscillator (IF VCO) 108 oscillate at the RF and IF, respectively.

The lock operation speed of the dual PLL 102 depends on the clock speed of the clock signal in the command transferred by the controller as shown in FIG. 4. This is because that the controller 100 uses an identical clock of TCXO in an idle sleep state as a reference clock for generating a transmission command to the dual PLL 102 regardless of the current mode of MS. That is, the TCXO operates at a frequency of approximately 32.768 kHz, requiring 5.5 ms to transfer the command to the dual PLL 102. The time of 5.5 ms spent transferring the command is added to the time spent in the RF tuning operation and, as a result, it takes a long time to receive the quick paging symbol. Therefore, there is a need to minimize time required for the controller 100 to transfer the command to the dual PLL 102.

In a preferred embodiment of the present invention, during the time that the controller 100 transmits the command to the dual PLL 102, the reference clock of the controller 100 is different from one of the idle sleep state at a clock speed of a predetermined high frequency oscillator. And, if the transmission of the command to the dual PLL 102 is completed, the reference clock returns to a previous one of the oscillator, not a new reference clock. The new reference clock has a frequency of, for example, 27 MHz or 10 MHz, which is more rapid as compared with the previous reference clock. This embodiment will be described in detail referring to FIG. 6 below.

Figure 6:
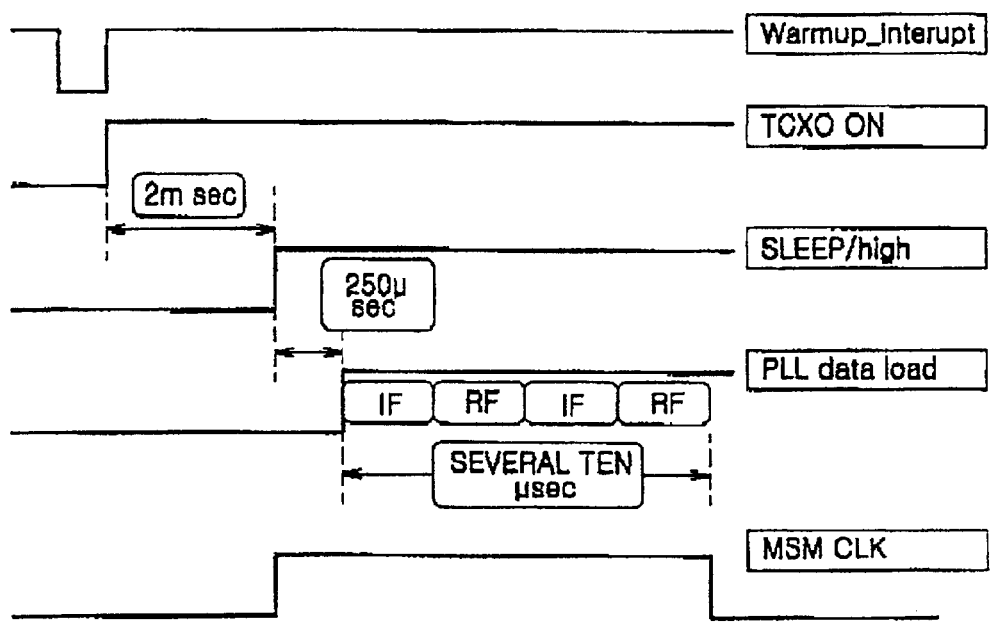
FIG. 6 is a timing diagram illustrating a quick paging operation in accordance with the present invention.

FIG. 6 is a timing diagram illustrating a quick paging operation in accordance with the present invention.

First, if the controller 100 generates a warmup interrupt signal (Warmup_interrupt) to start the quick paging operation in an idle sloop mode, then the TCXO separately provided begins to operate to generate the new MS reference clock. It takes the TCXO about 2 ms to warm up to normally operate. After the lapse of 2 ms, the controller 100 applies a sleep/high signal to the receiver, or the RF part, to start the operation thereof. At the same time, the controller 100 enables the new reference clock and then loads into the dual PLL 102 a predetermined command, or RF/IF transition command. After the command is loaded into the dual PLL 102, the controller 100 discontinues the generation of the reference clock.

Figure 7:
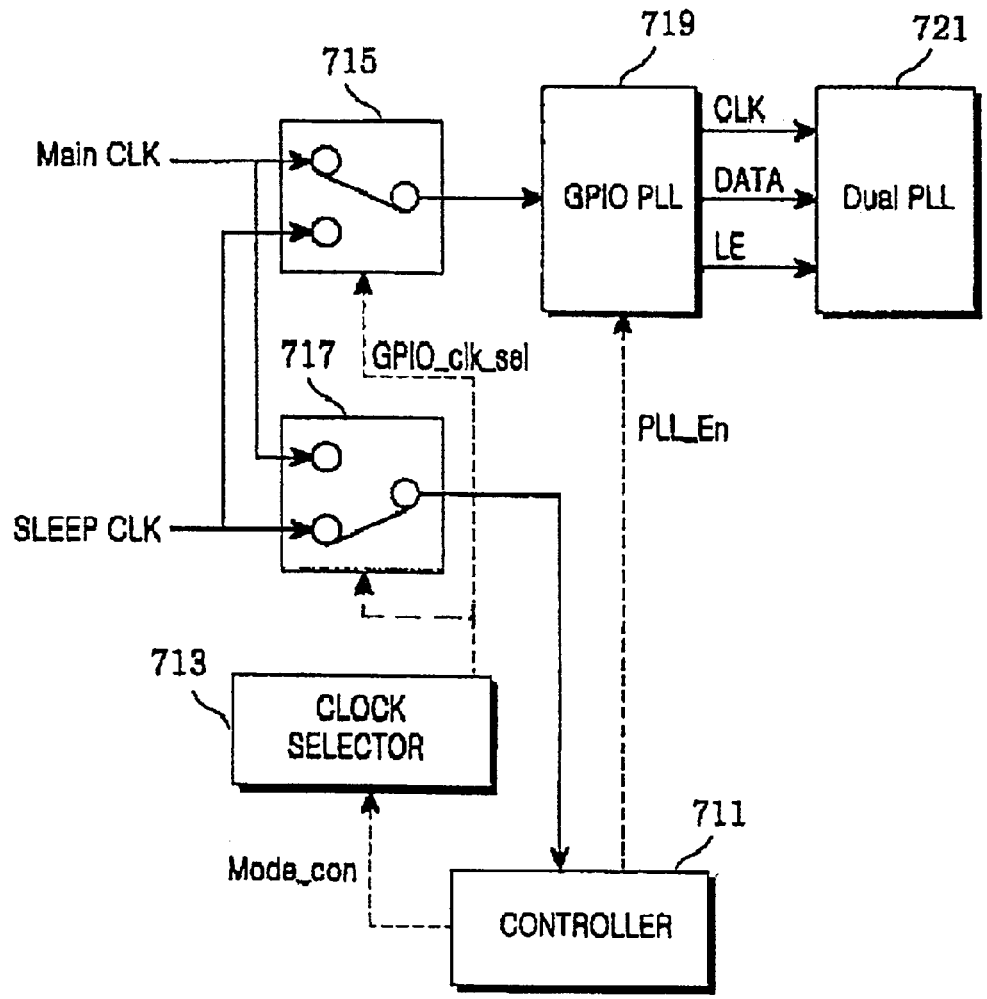
FIG. 7 is a block diagram showing the construction of a clock generator according to an embodiment of the present invention.

FIG. 7 is a block diagram showing the construction of a clock generator according to an embodiment of the present invention.

Referring to FIG. 7, the MS receives the quick paging message under the idle sleep mode and for more brief explanation, the above refers to "quick paging mode", hereinbelow. As illustrated in FIG. 7, the controller 711 outputs a mode control signal "MODE_CON" representing an operating mode depending on the current mode of the MS to a clock selector 713. Herein, there are two different mode control signals. One is an idle sleep mode signal representing that the MS is under the idle sleep mode. The other is a quick paging mode signal representing that the MS is under the quick paging mode. The clock selector 713 outputs a clock selection signal "GP IO_CLK_SEL" to a first switch 715 and a second switch 717 for selecting main clock if the mode control signal of the controller 711 is the idle sleep mode signal. The first switch 715 switches a main clock to connect a GPIO PLL 719 and the second switch 717 switches a main clock to connect the controller 711. Herein, the main clock is a reference clock for the operation of MS and the controller 711 can confirm that the MS is under the idle sleep mode depending on input of the main clock from the second switch 717. In addition, the controller 711 outputs an enable signal "PLL_EN" to the GPIO PLL 719 in order to receive channel signals. In response to the enable signal, the GPIO PLL 719 provides the main clock as a clock "CLK" of an external dual PLL 721. After receiving the clock "CLK", the external dual PLL 721 is synchronized with a radio frequency and an intermediate frequency, and locked to receive the corresponding channel signal.

The clock selector 713 outputs a clock selection signal "REF_CLK_SEL" for selecting sleep clock to the first switch 715 and the second switch 717 if the mode control signal of the controller 711 is the quick paging mode signal. Herein, the sleep clock has a cycle different from the main clock. The first switch 715 switches the sleep clock to connect the GPIO PLL 719 in accordance with a clock selection signal GPIO_CLK_SEL. And, the second switch 717 switches the sleep clock to connect the controller 711. In addition, the controller outputs the enable signal "PLL_EN" to the GPIO PLL 719 at the time of receiving the quick paging message. Herein, the controller 711 outputs the clock selection signal GPIO_CLK_SEL to the first and second switches 715 and 717 to provide the main clock to the GPIO PLL 719 after providing the CLK of the dual PLL 721. That is, the controller 711 provides the sleep clock as a clock "CLK" of the dual PLL 721 only under the quick paging mode for receiving the quick paging message. The GPIO PLL 719 provides the clock "CLK" of the dual PLL 721 in response to the enable signal PLL_EN and the dual PLL 721 receiving the clock "CLK" is synchronized with the radio frequency and the intermediate frequency, and locked to receive the quick paging message. Therefore, the MS can receive the quick paging message rapidly under the quick paging mode and minimize sleep current consumption by reducing operating time allocated for receiving of the quick paging message.

As apparent from the above description, the present invention provides a paging message reception apparatus and method wherein only a low frequency oscillator is operated in an idle sleep state until a quick paging message is received, thereby minimizing consumption of sleep current. Therefore, the present invention has an advantage of maximizing MS standby time by minimizing MS power consumption.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for receiving a quick paging message in a mobile station (MS) operated with first and second modes where the first mode is to receive a quick paging message in a predetermined time slot, comprising:

a controller for synchronizing with a second clock in the predetermined time slot and transmitting a command for obtaining a synchronization at a frequency of receiving the quick paging message;

where the MS selects a first clock having a first period as an operating clock under the second mode, and selects the second clock having a second period earlier than the first period under the first mode;

a dual phase-locked loop operated in response to the clock selected for synchronizing with frequency in response to the command from the controller;

an oscillator for oscillating at the synchronized frequency with the dual phase-locked loop; and a radio frequency part for receiving the quick paging message over a forward quick paging channel synchronously with the synchronized frequency from the oscillator.

2. The apparatus as set forth in claim 1, wherein the controller selects the first clock as an operating clock if the reception of the quick paging message is completed.

3. A method for receiving a quick paging message in a mobile station (MS) operated with first and second modes where the first mode is to receive a quick paging message in a predetermined time slot, comprising the steps of:

selecting a clock having a second period earlier than a first period as an operating clock if it is the first mode of MS; and synchronizing with the clock having the selected second period and transmitting a command for receiving the quick paging message to a dual phase-locked loop at the predetermined time slot to be thereby locked in a frequency capable of receiving the quick paging message in response to the command.

4. The method as set forth in claim 3, further comprising the step of:

selecting a clock having the first period as an operating clock if the reception of the quick paging message is completed.

* * * * *